(12) United States Patent
Nath

(10) Patent No.: US 8,653,978 B2
(45) Date of Patent: Feb. 18, 2014

(54) TEMPERATURE MONITORING OF A LIGHT GUIDE IN AN ILLUMINATION APPARATUS

(76) Inventor: Günther Nath, Grünwald (DE)

( * ) Notice: Subject to any disclaimer, the term of this patent is extended or adjusted under 35 U.S.C. 154(b) by 455 days.

(21) Appl. No.: 13/111,628

(22) Filed: May 19, 2011

(65) Prior Publication Data

US 2011/0286233 A1    Nov. 24, 2011

(30) Foreign Application Priority Data

May 21, 2010   (DE) .................. 10 2010 021 012
Jun. 18, 2010   (DE) .................. 10 2010 024 362
Jul. 7, 2010    (DE) .................. 10 2010 026 347

(51) Int. Cl.
*G02B 6/00*   (2006.01)

(52) U.S. Cl.
USPC ............. 340/584; 340/540; 362/580; 353/52; 385/13

(58) Field of Classification Search
USPC ........ 340/584, 540; 362/580; 353/52; 385/13
See application file for complete search history.

(56) References Cited

U.S. PATENT DOCUMENTS 5,231,681 A * 7/1993 Bergqvist ................... 385/13
2005/0084229 A1* 4/2005 Babbitt et al. .............. 385/146

FOREIGN PATENT DOCUMENTS

DE       4233087 A1    4/1994

* cited by examiner

*Primary Examiner* — Andrew Bee
(74) *Attorney, Agent, or Firm* — Barnes & Thornburg LLP

(57) ABSTRACT

An illumination apparatus having a radiation source and a light guide coupled thereto. The temperature of the light guide is monitored along its complete length. If a threshold temperature is exceeded, a switching mechanism will be triggered. The switching mechanism switches off the radiation source or triggers a warning signal.

21 Claims, 4 Drawing Sheets

TEMPERATURE MONITORING OF A LIGHT GUIDE IN AN ILLUMINATION APPARATUS

CROSS-REFERENCE TO RELATED APPLICATION

The present application claims the benefit of priority to German Patent Applications No. 10 2010 021 012.9 filed May 21, 2010, No. 10 2010 024 362.0 filed Jun. 18, 2010, and No. 10 2010 026 347.8 filed Jul. 7, 2010, the contents of which are incorporated herein by reference in their entirety.

BACKGROUND OF THE INVENTION

The present invention relates to an illumination apparatus having an irradiation source and a light guide coupled thereto. The light guide is flexible and positioned within a metallic protection tube which is flexible as well. The light guide includes a temperature monitoring mechanism which monitors the temperature along the complete length of the metallic flexible protection tube. In case the local threshold temperature is exceeded anywhere on the outer surface of the metallic protection tube, the radiation source is switched off with a delay of only a few minute. A temperature monitoring mechanism of this kind has become necessary because market-available radiation sources, such as video projector lamps, have become more and more powerful, and those radiation sources are coupled to flexible light guides, particularly to liquid core light guides as described in German Patent No. DE 42 33 087, for example.

For instance, it is possible to transmit, by means of a video projector lamp having a power of 200 W (e.g. Osram™-P-VIP200) or a video projector lamp having an output power of 330 W (e.g. Philips™-TOP-UHP 330 W) with an integrated ellipsoidal reflector, up to 40 W radiation power in the visible spectrum as an output from a liquid core light guide having a light active aperture of only 5 mm diameter and a total length of a few meters. Such high radiation output powers from a flexible light guide had so far been possible by means of laser radiation sources only.

What is industrially needed is an apparatus with a light guide for illumination in the visible range having an output radiation power which is as high as possible. For example, a 200 W video projector lamp of the type Osram™ P-VIP200 and a liquid core light guide of 10 m length and 5 mm light active diameter are used for three-dimensional optical digitization and measurement. In this example, the radiation output power from the light guide is 20 W!

Because the core of the light guide consists of an aqueous solution having a boiling point which is only slightly above 100° C., even small contaminations of the liquid core or insufficient filtering of the infrared portions of the radiation emitted from the radiation source or a mechanical deforming of the liquid core light guide by exertion of outer forces involve the danger of bubbles being formed in the liquid or a local overheating of the liquid core light guide and a quickly escalating temperature rise of the outer envelope which can damage the liquid core light guide and cause secondary damages. A monitoring of the outer temperature of the liquid core light guide and a possibility for switching off the radiation source have therefore become absolutely necessary.

FIG. 1 shows the temperature increase of the outer tube of a liquid core light guide (in this case a corrugated tube or a wrapped or spiralled tube made of stainless steel) as a function of time for a liquid core light guide having a light active diameter of 5 mm and a radiation output power of about 20 W, wherein a bubble of 3 mm diameter has artificially been set in the liquid. It is clear from this example that the radiation source (in this case a Philips™ video projector lamp having an electrical power of 330 W) should be switched off after 6 to 7 minutes at the latest, because the outer cover or envelope of the liquid core light guide (a flexible corrugated tube made of stainless steel) has already reached a temperature of more than 130° C.

FIG. 1 also shows that the radiation output power of the liquid core light guide decreases rapidly when the temperature of the outer corrugated tube of the liquid core light guide reaches values of more than 170 to 180° C. It is not sufficient to monitor the liquid core light guide by means of a beam splitter, because the transmission of the liquid core light guide at first decreases only slowly even though the outer temperature of the light guide protection tube has already reached a value of more than 120° C.

SUMMARY OF THE INVENTION

It is an object of the present invention to provide an effective temperature monitoring along the complete length of the light guide which produces a warning signal and/or switches off the radiation source when a critical outer temperature of the outer protection envelope of the light guide has been reached. The object is met by the illumination apparatus defined in present claim 1. The dependent claims relate to preferred embodiments.

Conventional vapor discharge lamps or filament lamps, lasers or high power LED arrays may be used as radiation sources. The light guide coupled to the radiation source does not necessarily have to be a liquid core light guide. However, the latter is described herein as a preferable option. According to the present invention, it is also possible to use light guides made from solid state materials, such as $SiO_2$, particularly in connection with laser radiation sources.

When using liquid core light guides, it is preferable to use the outer metallic flexible protection tube as an electrical conductor. This protective tube is generally a wrapped or corrugated tube made of aluminum, brass or stainless steel, or a tightly wrapped or spiralled wire coil, preferably made from a thermally weak conducting metal, such as stainless spring steel, which envelopes the central part of the liquid core light guide, typically a Teflon™-FEP-tube filled with a liquid.

A second electrical conductor, consisting of a thin switching wire insulated with a thin polymer layer along its complete length, is, for example, helically wound around the metallic protection tube, or extends only linearly and in parallel thereto, wherein the protection tube and the insulated switching wire are in direct contact with each other. It is particularly preferable to use a winding wherein the switching wire is returned phase-shifted at one end of the protection tube by 90° to 270°, preferably by about 180°, to form a double helix.

The rotation-symmetrical, double helical winding covers the outer surface of the metallic protection tube relatively close meshed. Thereby, the switching mechanism can be reliably started as soon as a local overheating arises at any arbitrary location of the metallic protection tube. The double helix can also be realized by a second switching wire. Alternatively, a mesh wire may be used as the switching wire as explained in further detail below.

The polymer for insulating the switching wire has a wall thickness of 0.1 to 0.3 mm and a melting point in the range from 60 to 200° C. depending on the critical switching temperature.

The complete system consisting of the insulated switching wire and the metallic protection tube is enveloped by a thin-walled, expanded thermal shrinkage tubing whose inner diameter is equal to or smaller than the outer diameter of the metallic protection tube after a non-stopped thermal shrinkage processing. The temperature at which the shrinkage tubing starts to reduce its diameter should be about 70 to 100° C.

In case a bubble is present inside the liquid core light guide, the metallic protection tube will at first heat up as a consequence of the light diffusion caused by the bubble and the transparency of the Teflon™-FEP light guide tube. The polymer, which is insulating, low melting and thin-walled, and which forms the insulation of the switching wire and contacts the metallic protection tube on its outer surface is thereby at first softened and eventually reaches its melting temperature. At the same time, the outer shrinkage tubing which is also warmed up by the local heating exerts an increased pressing force onto the insulated switching wire above the metallic protection tube.

After a few minutes, the material displacement of the melted polymer finally leads to an electrical contact between the switching wire and the metallic protection tube. This electrical contact can be used to trigger a warning signal or switch off the radiation source.

The time which is necessary to trigger the switching process in case of a local overheating of the outer tube of the liquid core light guide depends on a plurality of material constants:

LDPE or LLDPE can be used as insulation materials for the switching wire having a thickness of about 0.5 mm. The melting point of these materials is between 60 and 120° C.

The layer thickness of the insulation of the switching wire can be in the range from 0.1 to 0.5 mm, for example.

The switching wire itself can be made of copper or stainless steel. Stainless steel is preferable due to its bad thermal conductivity. Instead of a homogeneous wire it is also possible to use strands made from the above materials.

The metallic protection tube of the light guide can be a wrapped tube made of aluminum, brass or stainless steel. Stainless steel is preferable, because of its low thermal conductivity. Apart from a wrapped tube it is also possible to use a flexible wire spiral for the protection tube. The spiral should be tightly wrapped and preferably made of stainless steel or spring steel.

The thermal shrinkage tubing can be comprised of cross-linked polyolefines or PVC.

The light active diameter of the liquid core light guide can be 5 mm, for example, and the critical size of the bubble at which switching is to be performed is typically 2 to 3 mm.

The power of transmitted radiation lies in the range of multiple watts, that is mostly at above 10 W.

BEST MODE FOR CARRYING OUT THE INVENTION

In the following, a practical embodiment of an illumination apparatus having a video projector lamp of 120 W and a liquid core light guide is given, wherein the light guide has a light active diameter of 5 mm, an emission radiation power of 10 W, a protection tube consisting of a wrapped tube made of stainless steel and an artificially set bubble having a diameter of 3 mm. The illumination apparatus according to this embodiment comprises the temperature monitoring of the present invention which is adapted to trigger switching off of the radiation source due to overheating of the light guide within a few minutes.

According to the embodiment, a switching wire of 0.5 mm thickness made of annealed stainless steel is used which is insulated by non-cross-linked polyethylene (PE), preferably LDPE (low density PE) or LLDPE (linear low density PE). For the insulation for the switching wire it is also possible to use other polymers having a similarly low melting temperature as PE and which are not cross-linked. The wall thickness of the insulation enclosure of the switching wire may be between 0.1 and 0.5 mm. The thickness of the switching wire may be between 0.3 and 1 mm. The melting point of the insulation of the switching wire preferably lies in a range from 50 to 200° C.

The metallic flexible protection tube of the liquid core light guide is preferably made of stainless steel. The low thermal conductivity of stainless steel effects that the radiation loss of the bubble generates a higher local peak temperature at the protection tube. This higher temperature may be used for a quick contacting between the switching wire and the protection tube. A protection tube of aluminum generates a lower but spatially more extended local temperature rise so that the switching off process takes longer.

In the embodiment, the insulated switching wire and the wrapped tube of stainless steel are connected to a resistance measuring device by alligator clips and strands. The resistance measuring device indicates the electrical short circuit or the electrical contact by a decrease of the resistance from "high" to "low".

Typical switching times for switching off or contacting under the predetermined conditions lie within the range of 3 to 7 minutes after the radiation source has been switched on. The metallic protection tube for a short time reaches a temperature of up to 150° C. and rapidly cools down again after the radiation source has been switched off.

In practice, this switching off means that the liquid core light guide has to be replaced, because the bubble forming at such a high local temperature rise of the protection tube of stainless steel is irreversible. If it is desired that the outer temperature of the liquid core light guide only reaches maximum values below 100° C., such as 75° C., one can either cover the liquid core light guide by a further outer heat-insulated and flexible plastic tubing and/or choose a polymer with a lower melting point as the insulation material for the switching wire. For instance, material modifications with melting temperatures in the range from 45 to 95° C. may be found in the group of LLDPE (linear low density polyethylene).

Instead of only one switching wire, plural metal wires may be provided in the above-described manner between the thermal shrinkage tubing and the metallic protection tube for reasons of safety.

Of course, it is also possible to leave the switching wire in the embodiment uninsulated and cover the outer surface of the protection tube of stainless steel with a thin insulating layer of a low melting polymer instead. This modification works equally well but is more difficult to manufacture when using only one or a plurality of individual switching wires. However, the modification is of particular advantage in the case where a tube-shaped metallic mesh wire, instead of the single or plurality of individual switching wires, is positioned around the protection tube enveloped by the thin walled insulation layer. The mesh wire is simply provided on the complete insulated protection tube so that the wire winding process, which is work-intensive from the manufacturing point of view, can be dispensed with. The polymer insulation layer provides the electrical contact between the mesh wire and the metallic protection tube when reaching the melting point by means of the pressing force of the shrinkage tubing enclosing the metallic mesh wire as described further above. The mesh wire automatically comes to lie in the desired rotation-symmetric manner around the insulated protection tube.

Also instead of the shrinkage tubing, which exerts the increased pressing force of the insulated switching wire onto the metallic protection tube only in case of a local temperature rise, another coating, e.g. made of an elastomer like silicon, may be chosen which permanently presses the insulated switching wire to the metallic outer tube. The same function could also be achieved by a mesh of metallic wires or plastic fibers which can permanently produce radial pressure with linear tightening. A metallic electrically grounded mesh would moreover involve the advantage of screening from electromagnetic disturbance radiation which may emanate from the long metallic switching wire. Instead of the shrinkage tubing, a heat shrinkage foil may be used which presses the switching wire on the metallic protection tube in case of a temperature rise. Finally, a stretch foil may effect a permanent pressing force of the switching wire.

For reasons of completeness it is further noted that instead of an electrically conducting switching wire a POF fiber may be used in the same configuration. The POF (plastic optical fiber) is also pressed on the metallic protection tube by means of a shrinkage tubing in case of heat generation. A POF fiber comprises a light conducting core, typically of acrylic glass, a very thin optical insulation of a fluor-containing polymer and an outer protective layer, which is mostly comprised of PE or PVC or PA (polyamide). At one end of the POV fiber, radiation is coupled in from a diode (LED), while the other end is connected to a receiver. If the POF fiber is pressed on the structure surface (containing grooves) of the metallic protection tube by construction of the shrinkage tubing in case of local heat generation, the deformation of the POF fiber (at temperatures of about 100° C. and more) will be so strong that the optical transmission of the POF fiber will drastically decrease. This strong change of the transmission may be used for a switching process, e.g. for switching off the radiation source.

BRIEF DESCRIPTION OF THE DRAWINGS

In the following a more detailed description of the present invention will be given based on the enclosed drawings.

DETAILED DESCRIPTION OF THE DRAWINGS

Figure 1:
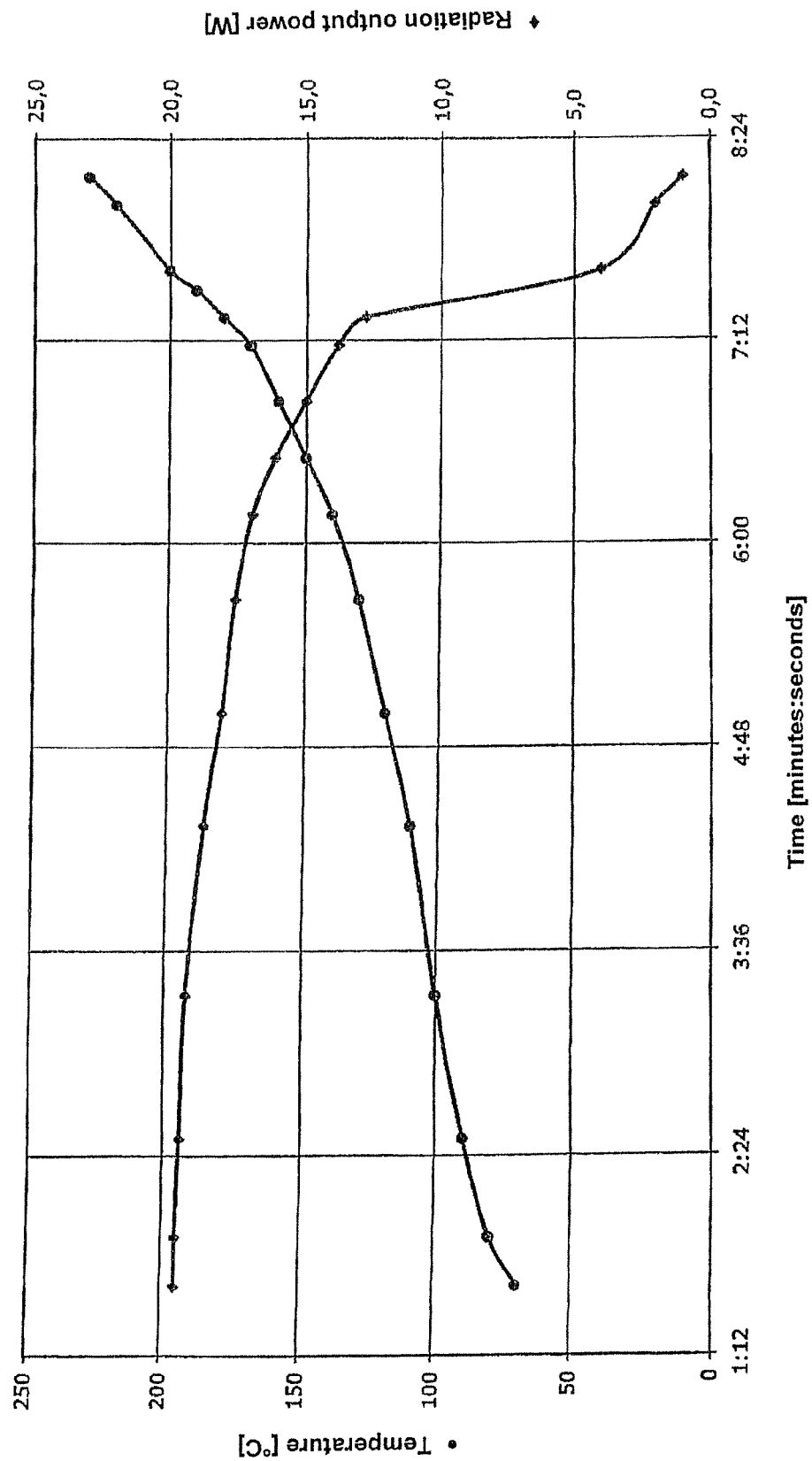
FIG. 1 shows the dependency between radiation power and temperature as already discussed further above.
Figure 2:
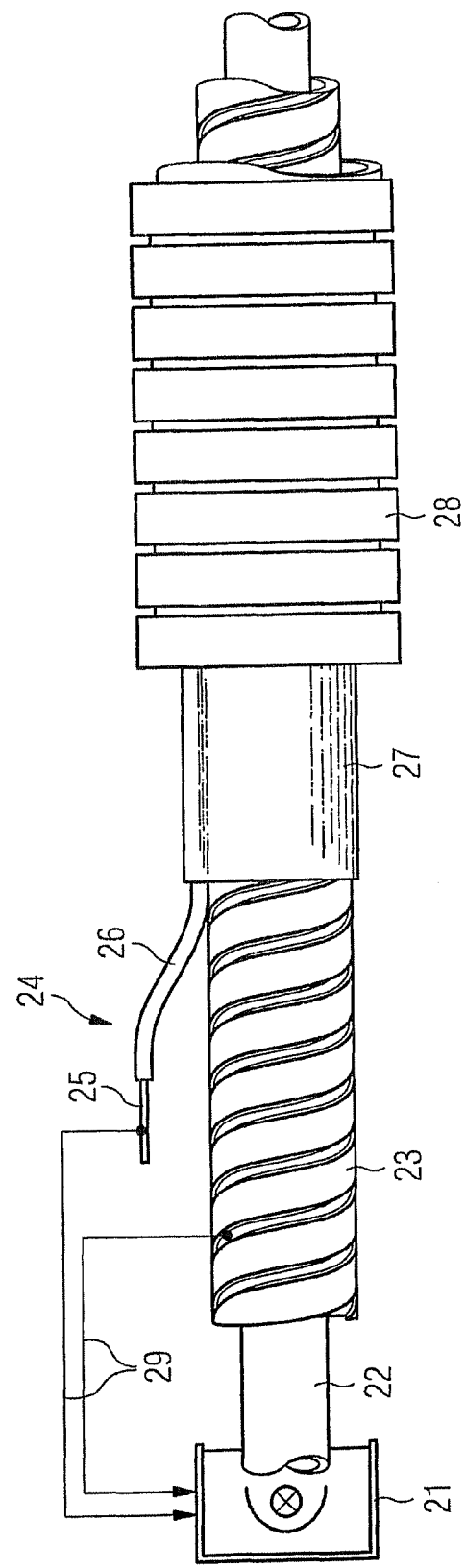
FIG. 2 shows a schematic and partially sectional elevational view of the illumination apparatus with temperature monitoring according to the present invention.

FIG. 2 shows a schematically drawn radiation source 21 which is located within a housing. The radiation emitted therefrom is focused into the light guide, here the liquid light guide 22. The light guide 22 consists, for example, of a Teflon™-FEP tube which is filled with an inorganic salt solution with a higher refractive index than the surrounding tube. This flexible light guide 22 is covered by a metallic flexible protection tube 23 which is in turn enveloped by a shrinkage tubing 27. In this example, the protection tube 23 consists of a wrapped spiral spring preferably made of stainless steel wire or spring steel wire having a thermal conductivity which is as slow as possible.

Between the protection tube 23 and the shrinkage tubing 27 extends an insulated switching wire 24 having a metallic core 25 and an insulating cover 26 made of plastics material. The switching wire 24 is pressed by a tight fitting shrinkage tube 27 onto the metallic protection tube 23. The pressing force is exerted across the complete length thereof which may be up to 30 meters.

From the conducting core 25 of the switching wire 24 and from the metallic protection tube 23 electrically conducting strands 29 lead to the housing of the radiation source 21 where, in a manner not shown here, the change of the ohmic resistance between the core 25 of the switching wire 24 and the metallic protection tube 23 is detected and processed. This electrical resistance is defined in the case of an ordinary working, bubble-free liquid core light guide by the resistance of the insulating envelope (practically R=∞). It reduces to the resistance value of the electrical conductor (nearly R=0Ω) when an air bubble exists in the liquid core light guide due to a local overheating of the metallic protection tube 23. The loss and diffusion radiation caused by the bubble lies in the power region of one or several watts. In this case, the insulation 26 of the switching wire 24 is melting and the shrinkage tubing 27 at the same time causes an increased pressing force of the switching wire 24 onto the protection tube 23 at the location of the bubble. This eventually effects an electrical short circuit which may be used for switching off the radiation source 21.

The complete system consisting of liquid core light guide 22, protection tube 23, switching wire 24 and shrinkage tubing 27 can again be covered by a flexible thermally insulating plastics tube 28. This effects that the temperature rise at the outer surface of the complete light guide system is hardly noticeable until the radiation source 21 is switched off and stays at least below 75° C., thereby meeting a request made from the Norwegian Technical Control Board.

It has turned out that the most sensitive and therefore most rapid switch is obtainable when the metallic flexible protection tube 23 is a flexibly wrapped spiral of stainless steel or spring steel having a thermal conductivity which is as low as possible, a wire thickness between 0.5 mm and 1 mm and a small air spacing between the individual spiral windings. Moreover, the sensitivity of the switch may be increased by forming the electrical conducting core 25 of the switching wire 24 of a material which also has a low thermal conductivity such as stainless steel wires or strands.

Further, it has surprisingly turned out that the groove structure of the surface of the protection tube 23 or more generally the structured surface thereof accelerates the switching process, wherein the switching wire 24 should possibly extend perpendicular to the grooves. The preferable surface groove structure of this type is predominantly present for protection tubes in the form of wrapped wire spirals and, to a somewhat less degree, in metallic winding tubes similar to known handheld showering tubes. When using a metallic winding tube as protection tube 23, stainless steel is the preferable material therefor. Protection tubes 23 of this kind are also known under the names spirally wrapped metal tubes or "Agraff" tubes.

Figure 3:
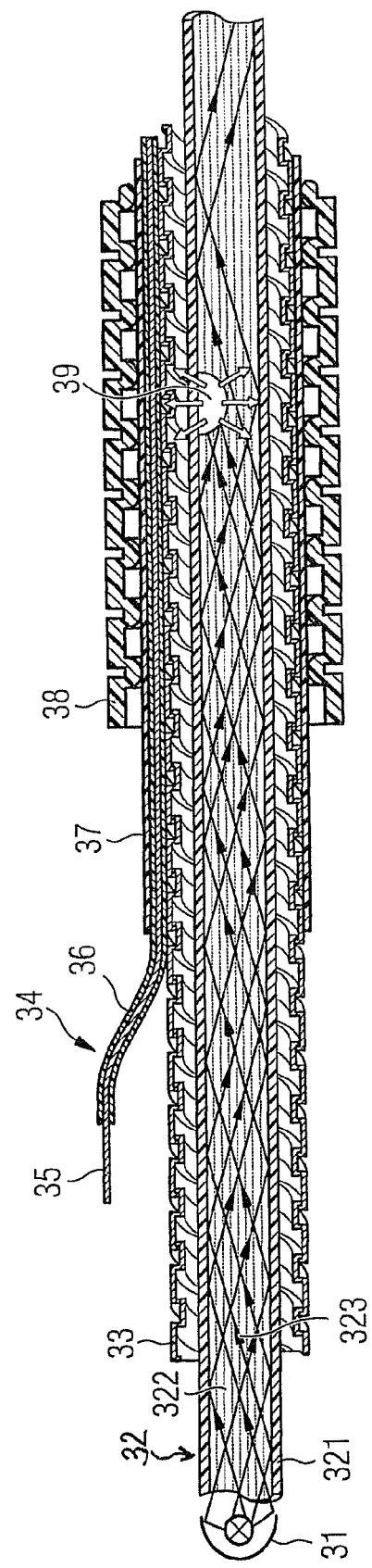
FIG. 3 shows a longitudinal sectional view of the illumination apparatus according to FIG. 2.

FIG. 3 shows a longitudinal sectional view of the liquid core light guide 32 including its various envelopes, namely the metallic flexible protection tube 33 which here has the form of a wrapped or spiralled tube of stainless steel, the shrinkage tubing 37, the insulation tube 38 of plastics material and the switching wire 34 extending between the shrinkage tubing 37 and the metallic protection tube 33. The core 35 of the switching wire 34 is preferably made of a wire of annealed stainless steel or a strand thereof and an insulation 36 of a low melting plastics such as PE, LDPE, PVC or PU.

The radiation source 31 focuses the light bundle 323 into the liquid core light guide which is comprised of a flexible tube 321 made from a fluorocarbon polymer and filled with a liquid 322. The liquid core light guide comprises at one location a light diffusing bubble 39. The loss or diffusion radiation caused by the bubble 39 transmits through the fluorocarbon polymer tube 321 and locally heats up the metallic protection tube 33. Due to its low thermal conductivity, the protection tube 33 rapidly generates a high peak temperature which is passed on to the neighboring shrinkage tubing 37.

Figure 4:
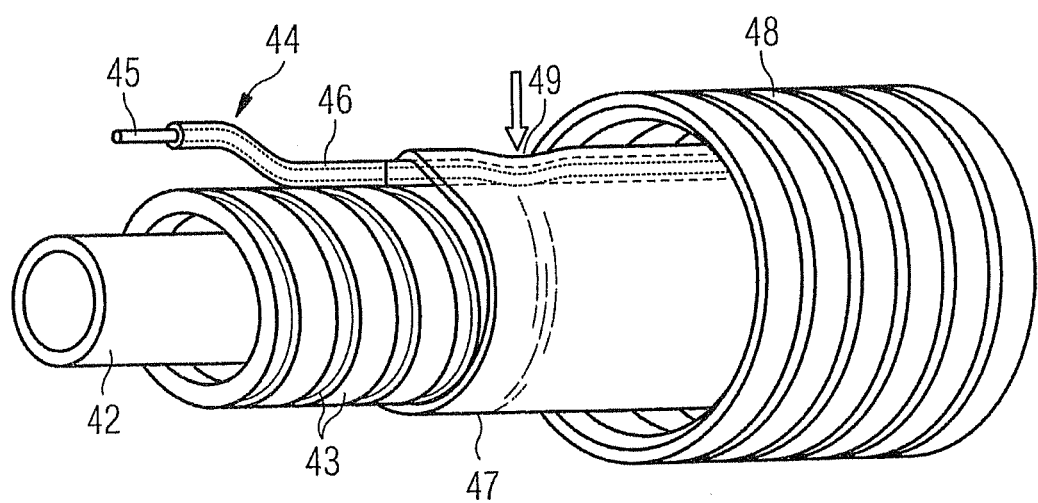
FIG. 4 shows a perspective and partially sectional view of the light guide and its enclosures.

FIG. 4 shows the effect of the bubble within the liquid core light guide 42. One can see a lateral contraction 49 of the shrinkage tubing 47 within the insulation tube 48. The contraction results in that the switching wire 44 is pressed on the hot zone of the metallic protection tube 43 so that the softened polymer insulation of the switching wire 44 is pressed away. The surface groove structure of the metallic protection tube 43 facilitates the displacement of the softened insulation 46 and it eventually comes to an electrical contact between the core 45 of the switching wire 44 and the metallic protection tube 43. This contact can be used as a trigger for switching off the radiation source.

Surprisingly, it has turned out that when using a switching wire 44 with a wire 45 or a strand of stainless steel as the core material, the electrical contacting between the switching wire 44 and the protection tube 43 is definite and irreversible. This has not always been the case when using copper as the material for the switching wire, wherein it has often been observed that the electrical contacting jumps plural times between "low" and "high" until "low" (i.e. about 0Ω) has finally been reached.

One may also start from the beginning with a shunt resistance of a few kΩ at the distal end of the light guide, i.e. at the light entry or exit side, to bridge the two arms 43, 45 of the switching circuit, so that a small control current is always flowing in the switching circuit. This control current may be used to indicate the integrity of the switching wire 44 as long as the switching mechanism has not yet been triggered.

The principles, preferred embodiments, and modes of operation of the present invention have been described in the foregoing specification. The invention is, however, not to be construed as limited to the particular forms disclosed, since these are to be regarded as illustrative rather than restrictive. Variations and changes may be made by those skilled in the art without departing from the spirit and scope of the present invention.

LIST OF REFERENCE SIGNS 21, 31 radiation source
22, 32, 42 liquid core light guide
321 fluorocarbon polymer tube
322 liquid core
23, 33, 43 metallic protection tube
24, 34, 44 switching wire
25, 35, 45 metallic core
26, 36, 46 insulating cover
27, 37, 47 shrinkage tubing
28, 38, 48 plastics tube
29 strands
39 air bubble
49 lateral contraction

What is claimed is:
1. An illumination apparatus comprising:
a radiation source;
a metallic protection tube; and
a light guide which is coupled to the radiation source and provided in an inner lumen of the metallic protection tube,
wherein a pressing tube envelopes the protection tube entirely or at least partially, at least one wire made of metal or an optical plastic fiber is provided between the pressing tube and the protection tube,
wherein the wire is separated from the protection tube at least at a part of its outer surface only by an insulating plastic cover, and the pressing tube exerts a pressing force which pushes the wire against the surface of the protection tube,
wherein the pressing force either is exerted permanently or is only temporarily generated or enhanced in case of a temperature rise of the pressing tube.

2. The illumination apparatus of claim 1, wherein the insulating plastic cover comprises a non-cross-linked polymer selected from a group consisting of non-cross-linked polyethylene, low density polyethylene, linear low density polyethylene, and PVC.

3. The illumination apparatus of claim 1, wherein the insulating plastic cover envelopes at least one of the wire and the protection tube.

4. The illumination apparatus of claim 1, wherein the insulating plastic cover has a wall thickness of 0.1 mm to 2 mm.

5. The illumination apparatus of claim 1, wherein the insulating plastic cover has a melting point in the range from 45° C. to 200° C.

6. The illumination apparatus of claim 1, wherein the wire consists substantially of copper or stainless steel and has a diameter of 0.3 mm to 2 mm.

7. The illumination apparatus of claim 1, wherein the wire is helically wound around the protection tube establishing contact thereto around an outer surface of the protection tube or at least a part of a length of the protection tube, wherein the period of the helix of the wire lies within the order of magnitude of the outer diameter of the protection tube or is larger than it.

8. The illumination apparatus of claim 1, wherein the wire extends substantially linear and in parallel to the protection tube.

9. The illumination apparatus of claim 1, wherein plural metal wires, particularly in the form of a mesh, are provided between the pressing tube and the protection tube and are separated from the latter by an insulating plastics material.

10. The illumination apparatus of claim 1, wherein the wire returns at one end of the protection tube in the form of a double helix.

11. The illumination apparatus of claim 1, wherein at least one second wire is disposed between the pressing tube and the protection tube in addition to said first wire, wherein the second wire is separated from the protection tube by the insulating plastic cover, and wherein the second wire extends either in parallel to the protection tube or helically around the protection tube so that the second wire forms a double helix together with the first wire.

12. The illumination apparatus of claim 1, wherein the pressing tube is a polymer tube of a thermal shrinkage tubing.

13. The illumination apparatus of claim 1, wherein the radiation source comprises a vapor discharge lamp, a video projector lamp, a laser, an LED array or a filament lamp.

14. The illumination apparatus of claim 1, wherein the light guiding medium of the light guide is glass or a liquid.

15. The illumination apparatus of claim 1, wherein the light guide is flexible and located in the inner lumen of the protection tube which is also flexible.

16. The illumination apparatus of claim 1, wherein the light guide comprises a fluorocarbon polymer tube filled with a liquid.

17. The illumination apparatus of claim 1, wherein the metallic protection tube is a flexible wrapped tube of aluminum, brass or stainless steel, or a spirally wrapped metal tube, or an Agraff tube made of one of aluminum, brass or stainless steel.

18. The illumination apparatus of claim 1, wherein the metallic protection tube is a tube-like metallic mesh.

19. The illumination apparatus of claim 1, wherein the metallic protection tube is comprised of a tightly wound wire spiral of stainless steel or spring steel, and wherein a small spacing is provided between the individual windings of the wire spiral.

20. The illumination apparatus of claim 1, wherein the wire is a light-conducting plastic fiber, and when reaching a threshold temperature, the pressing tube pushes the plastic fiber so strongly against the protection tube that the light transmission in the plastic fiber sharply decreases or is entirely interrupted.

21. The illumination apparatus of claim 5, wherein the insulating plastic cover has a melting point in the range between 60° C. and 120° C.

\* \* \* \* \*